Nov. 3, 1953
C. E. SLAUGHTER
2,657,431
METHOD OF MAKING PLASTIC ARTICLES
Filed Feb. 8, 1951
3 Sheets-Sheet 1
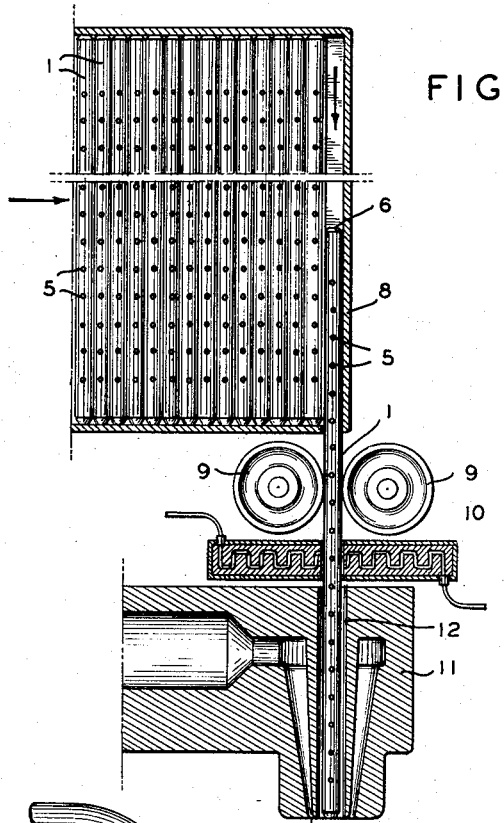
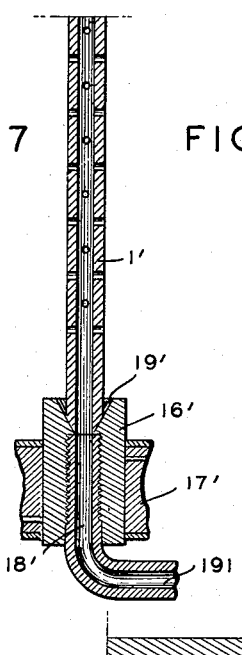
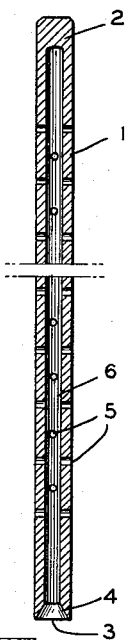
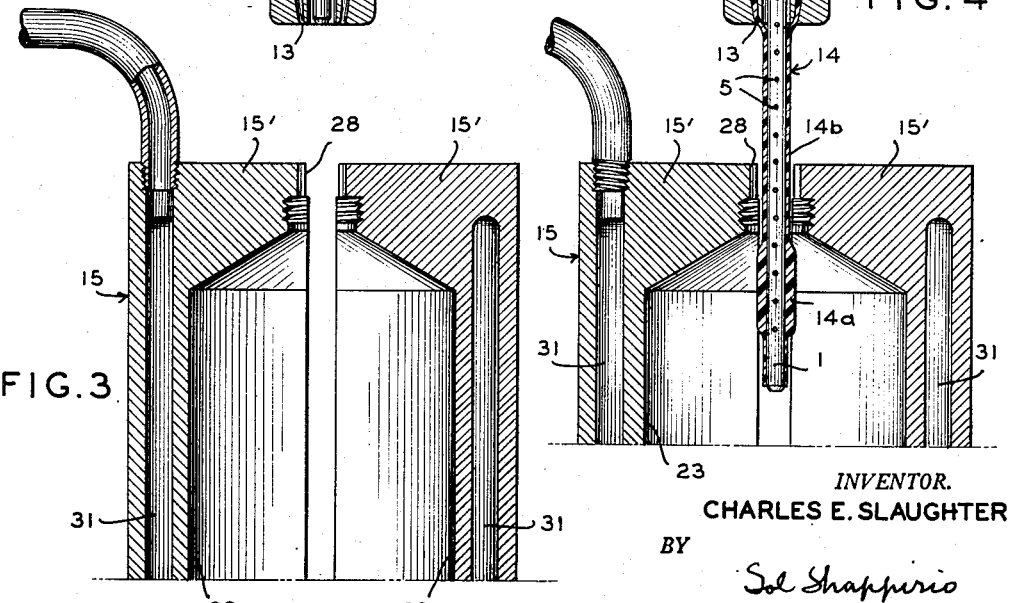
INVENTOR.
CHARLES E. SLAUGHTER
BY
Sol Shapperio
ATTORNEY Nov. 3, 1953  C. E. SLAUGHTER  2,657,431
METHOD OF MAKING PLASTIC ARTICLES
Filed Feb. 8, 1951  3 Sheets-Sheet 2

INVENTOR.
CHARLES E. SLAUGHTER
BY
Sol Shappirio
ATTORNEY

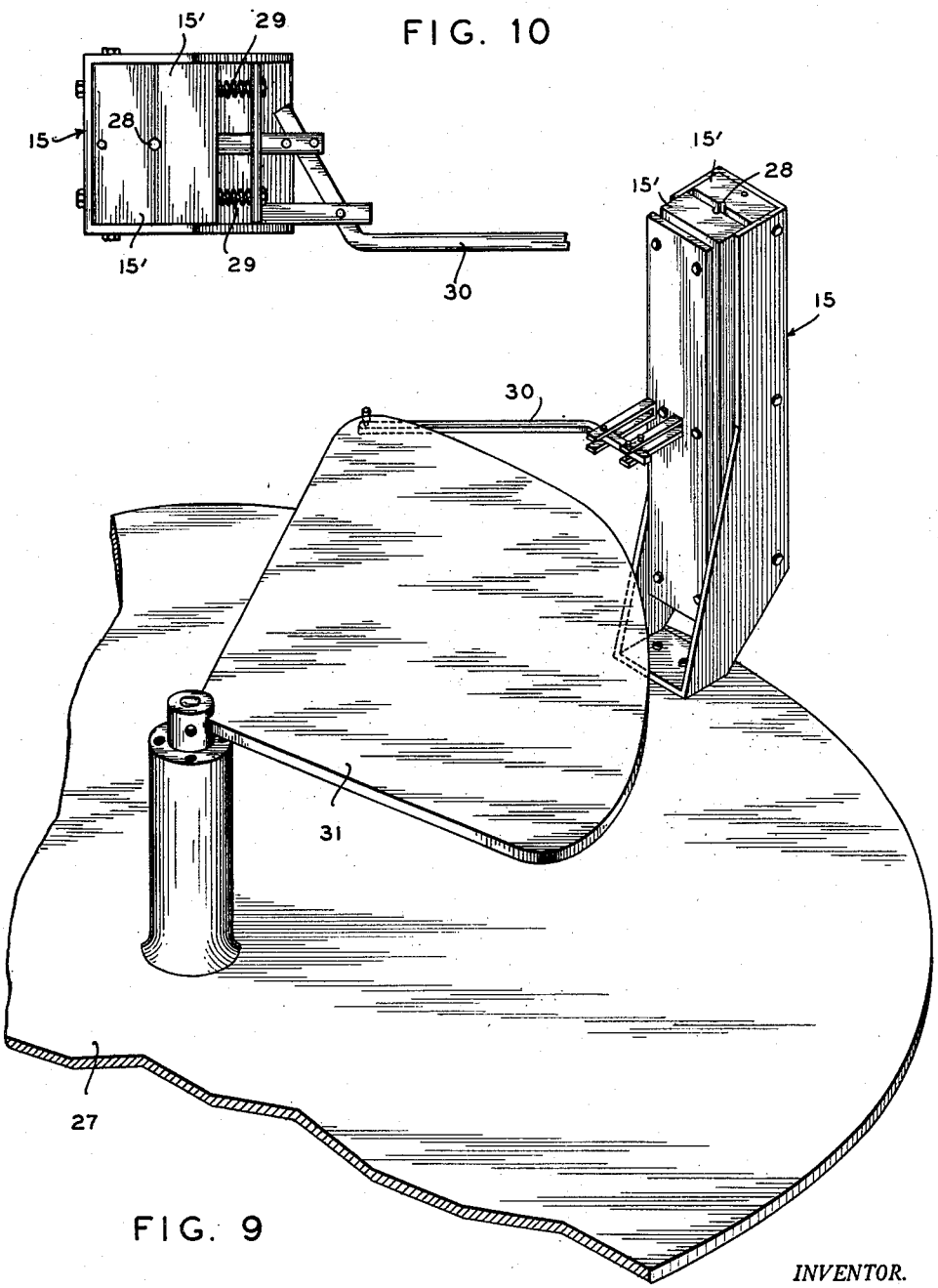

Patented Nov. 3, 1953

2,657,431

UNITED STATES PATENT OFFICE 2,657,431

METHOD OF MAKING PLASTIC ARTICLES

Charles E. Slaughter, New Canaan, Conn., assignor to Extruded Plastics, Inc., a corporation of Connecticut Application February 8, 1951, Serial No. 209,939

3 Claims. (Cl. 18—55)

This invention relates to methods of making articles of plastic, particularly to articles of thin-walled character such as collapsible tubes.

A number of methods and machines have been proposed in the prior art for the production of various types of articles, and for example in making plastic bottles by the blowing process. Mills Patent No. 2,515,093 is illustrative. Basically, this and similar patents cover the extrusion or injection of a soft, heated, heavy walled plastic tube extruded into a die made up of two halves which may be opened or closed by fluid pressure. Due to the comparatively heavy wall as compared to the length of the tube that is used in the blowing process, the extrusion can be handled. Materials such as polyethylene which soften by heat but do not melt, utilized in tubing for such purposes, call for heavy wall thickness and comparatively short length, to enable them to withstand the amount of handling required. Such practices would be useless in any attempt to manufacture articles of thin body wall, such as collapsible tubes, and it would be impossible to control a thin walled tubing either vertically or horizontally by the prior art methods.

Among the objects of the present invention is the production of extruded articles and methods for making them which enable collapsible tubes to be produced readily and economically from plastic.

Other objects include the utilization of the principles, and methods of the present invention in production of a variety of articles, since the methods are adaptable to utilization in widespread fields.

Still further objects and advantages of the present invention will appear from the more detailed description set forth below it being understood that such more detailed description is given by way of illustration and explanation only and not by way of limitation since various changes therein may be made by those skilled in the art without departing from the scope and spirit of the present invention.

Figure 5:
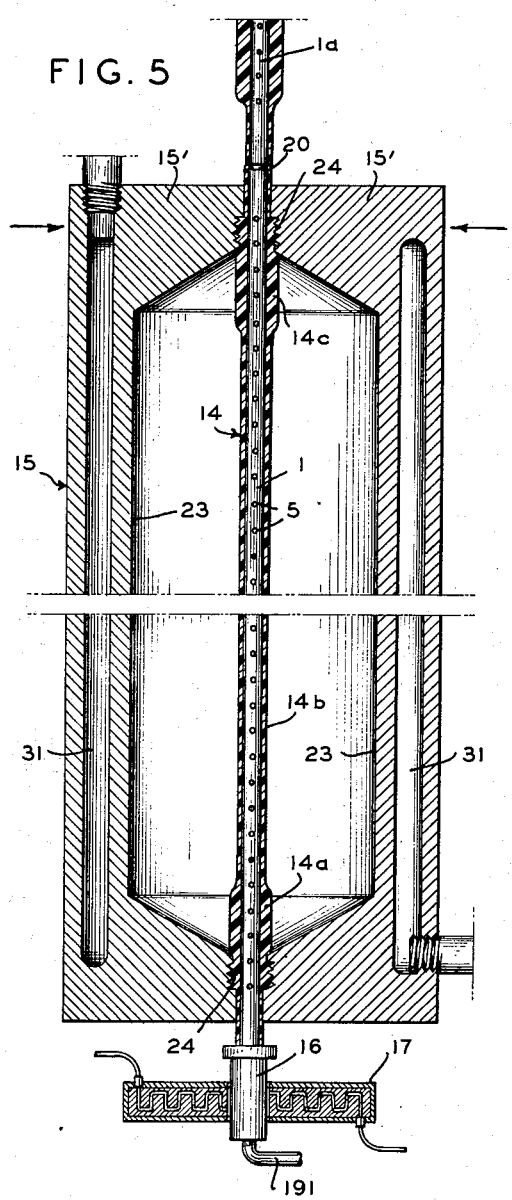
Figure 6:
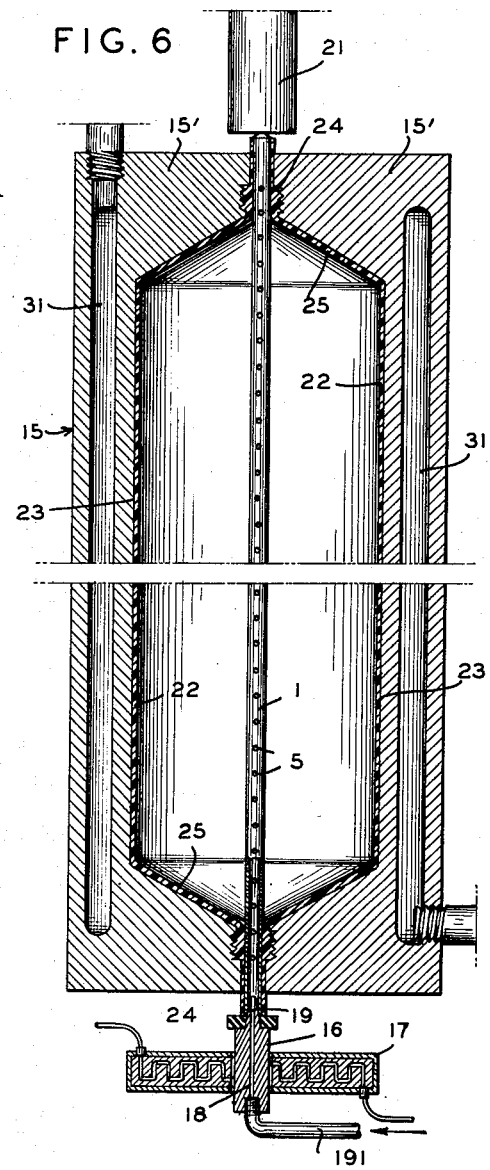
Figure 8:
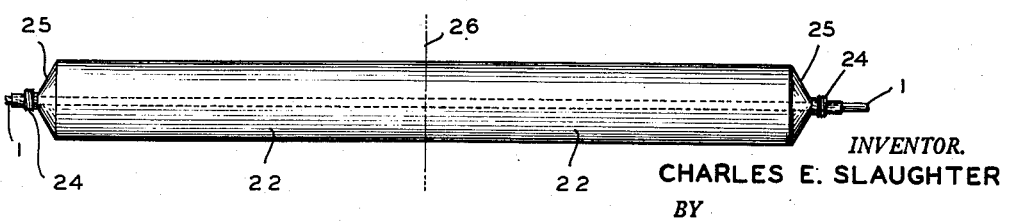

In connection with that more detailed description there is shown in the accompanying drawings, in Figure 1, a longitudinal cross section through a carrier or mandrel used as a support for the plastic and the extrusion produced therefrom, in Figure 2, an elevation, partly in section, of the mandrel delivery and extruder; in Figure 3, a vertical section through a fragmentary view of a mold used for producing the shaped plastic article; in Figure 4, a vertical section through a fragmentary view of the extruder and mold; in Figure 5, a vertical section through the mold with the plastic covered mandrel in position prior to expansion of the plastic; in Figure 6, a similar view to that of Figure 5 showing the expanded plastic; in Figure 7, a fragmentary detail in section of the fluid delivery for expansion; in Figure 8, a plan view of the extrusion produced herein for utilization for collapsible tubes; in Figure 9, a fragmentary perspective view of a portion of a machine; and in Figure 10, a plan view of the mold.

In accordance with the present invention, plastic articles are produced by depositing the desired organic plastic material on a carrier or mandrel to facilitate handling and manipulation of the plastic. The plastic covered carrier or mandrel is then subjected to successive manipulative or other treatments to produce a desired article therefrom after which the article is freed from the carrier or mandrel and the latter returned to the cycle for reuse. In this way it is possible to manipulate and shape organic plastic materials in procedures which would be impossible otherwise. For example, as indicated above, the prior art has not produced thin walled non-self-sustaining collapsible tubes from plastics, of satisfactory character by economical procedures. The present invention by utilizing a carrier or mandrel as the support for the plastic throughout the cycle of operations eliminates the difficulties and solves the problems of the art. Collapsible tubes made from organic plastics and having thin-walls may be produced readily and economically. But the invention is not limited to production of plastic collapsible tubes, since other types of articles may also be produced, and the principles, and methods taught herein, are useful in many other ways and applicable to the production of a variety of articles.

The carrier used is a tubular mandrel having a central bore and a multiplicity of perforations penetrating the walls of the mandrel from the central bore to the exterior surface of the mandrel. Most desirably the bore is closed at one end and open at the other, so that a fluid such as air may be introduced into the bore to penetrate the perforations and expand a plastic thereon. A mandrel having both ends open may be used if one end is temporarily closed to block exit of fluid during the blowing operation, but the preferred form of mandrel is that described above having one end closed and one end open.

In the movement of the plastic covered or ensheathed mandrels in the present process, it is desirable to use magnetic, particularly electromagnetic devices for such purposes. In that event, the mandrel is desirably produced from magnetizable material such as iron or steel, so that a generated magnetic flux can be utilized to direct and control the movement of the mandrel. The mandrels may be readily produced from tube or rod stock as will be apparent. If desired, the mandrel can be made by powder metallurgy technique and shaped from the desired powdered metal and sintered in the usual way to produce a porous side wall of porosity to permit fluid passage therethrough, in lieu of perforations; but in such cases the end of the porous metal mandrel will be closed permanently or temporarily, during the expanding step as set forth above.

The organic plastic material that may be utilized, may vary widely. Most desirably it is a synthetic resinous material, and the thermoplastics are particularly useful. However the term is not intended to exclude materials such as polyethylene, which softens before it melts. As exemplary plastics there may be mentioned cellulose derivatives including the esters like cellulose nitrate, cellulose acetate, cellulose acetate-butyrate such as "Tenite," and the ethers such as ethyl cellulose, benzyl cellulose, etc., polyvinyl materials such as polymerized vinyl acetate and vinylidene chloride, and copolymers of for example vinyl chloride and vinyl acetate, the polyvinyls being represented for example by "Saran"; polymerized styrenes, polyacrylates and polymethacrylates and polymethyl methacrylates; polyethylenes; nylon resins, and other thermoplastic and resinous compositions particularly those that can be extruded in continuous lengths.

The plastic is applied to the mandrel so that the perforations are covered by the plastic. In this way fluid introduced into the bore will force expansion of the plastic. Any method and machine may be used to apply the plastic to the mandrel, and even hand applying operations can be employed. But most desirably extrusion methods and machines are used for this purpose, including such methods and machines as illustrated in Patent No. 2,452,607. As there shown an extruder of the cross-head type is illustrated, a tubular extrusion being produced. Under the present invention, the plastic is extruded as tubing continuously in heated expandable condition, and the mandrels are inserted successively within the tubing as the tubing attains its tubular shape and as the tubing is being extruded. Any desired means such as feed rolls, are employed to feed the mandrels successively through a passageway in the extrusion head which leads directly to the extrusion orifice so that the mandrels are inserted within the tubing as the latter is being formed, movement of the mandrels being desirably controlled at all times as by magnetic means. In this way the mandrels are each given a coating or sheath of plastic.

The thickness of the plastic tube that ensheathes the mandrel or carrier is dependent on two factors: first, the rate of extrusion of the plastic from the die; and second, the rate at which the extruded plastic tube is drawn away from the die. For example, the rate of extrusion of plastic may be kept fairly constant, while varying the movement of the mandrel in a predetermined manner to control the thickness of plastic deposition, to produce varying thickness of the plastic layer on the mandrel. In this way it is thus possible to increase the thickness of plastic at each end of the mandrel while the plastic covering the perforations is much thinner. If the thicker end portions are held against expansion while the central thinner portion is expanded, the latter will produce an expanded thin-walled tube having a thick-walled rigid portion at each end of the thin-walled tube. If the latter is cut transversely at its center, two collapsible tube blanks are obtained. Any desired variation in wall-thickness deposition of plastic may thus be produced as desired.

The plastic ensheathed mandrel is then ready for expansion as by forcing fluid into the bore of the mandrel which fluid passing through the perforations will expand the plastic while the latter is in expandible condition. If desired, the plastic ensheathed mandrels may be made at one place and shipped to another for production of the expanded article. Generally however, the plastic ensheathed mandrel will be produced by extrusion, and while the plastic is still hot enough from the extrusion zone to be expandible, it is subjected to expansion.

For this purpose the mandrel is placed in a holder in which it is held in position for blowing air into the central bore of the mandrel. The movement of mandrel to holder may be manual or automatic as for example by controlled electromagnetic operation. If the mandrel has one end closed, the air must pass through the perforations. The holder grips the mandrel at the outer ends of the plastic sheath so that the latter are held against expansion while the central portion of the sheath is expanded. Desirably, the holder is a die which may be a split die, the parts being separable by mechanical, pneumatic or electrical means, to open position to receive the plastic ensheathed mandrel, and then the die closed to lock the mandrel in position, the central portion of the die being shaped to produce the contour desired by the plastic being blown up into contact with the shaping portion of the die. It may be maintained in expanded condition until cooled or set. The die is then opened, the mandrel removed by the plastic being cut as may be necessary, the mandrel returned to the mandrel storage chamber, and the plastic article given any necessary finishing operation.

While these several operations can be carried out manually, a completely automatic operation is economically feasible. For this purpose, the extrusion and production of plastic ensheathed mandrels is carried out continuously. A series of molds is mounted on a turn-table, movement of the molds into receiving position for the plastic ensheathed mandrels being synchronized with the production and delivery of the latter. The molds advance step-by-step through the mandrel receiving position where the mold is open and receives the plastic ensheathed mandrel, whereupon the mold closes to grip the ends of the plastic tubing firmly against the mandrel. The closed mold carrying the plastic ensheathed mandrel then moves to the expanding station while the next mold moves into position to receive the next mandrel. At the expanding station, air is blown into the bore of the mandrel to expand the surrounding tube into contact with the walls of the die or mold. Air under pressure is desirably used as the expansion fluid, and the air pressure is exerted within the now formed plastic tube until the plastic has cooled and becomes solid or set. At this time the die is opened automatically at the releasing station and the finished article ejected. It is then only necessary to cut transversely along the center of the expanded tube, remove the mandrel, and trim any flash or surplus plastic.

To illustrate more specifically the operations that may be carried out, reference may be made to the drawings. The type of mandrel desirably used is shown in Figure 1 where the tubular mandrel 1 has closed end 2, the other end 3 being open and provided with a seat 4 for engagement against a fluid delivery line. Perforations 5 are provided from the bore 6 to exterior surface of the mandrel. A magazine or mandrel storage 8 delivers the mandrels automatically and successively to pinch rolls 9, 9 and then through an electromagnetic coil 10 which tends to pull the mandrels, made of magnetizable material, toward the extruder. The pinch rolls are driven at a predetermined speed. The extruder 11 is located just below the delivery line of the pinch rolls 9 and coil 10. A passage 12 through the extruder 11 leads to the extrusion orifice 13 and the mandrels are delivered to the passage 12. As a mandrel 1 clears the pinch rolls 9, 9, gravity tends to pull it out of the core of the die but it cannot be pulled from the die due to the magnetic force holding it against the next succeeding mandrel 1a which in turn is firmly held by the pinch rolls 9, 9. The mandrel 1, passing through the extrusion orifice 13 enters the plastic tube 14 as the latter is being extruded, and the plastic tube thus formed about the mandrel 1 covers the perforations 5 in the mandrel. At the beginning of plastic deposition on the mandrel 1, the pinch rolls 9, 9 are slowed down with the result that the plastic deposition at 14a produces a relatively thick wall. When a sufficient thick wall deposition has been produced, the pinch rolls 9, 9 are then rotated at a more rapid speed to produce the thin wall portion 14b. When a sufficient length of thin wall deposition has been obtained, again the pinch rolls are slowed down to produce a thick wall deposition 14c toward the other end of the mandrel.

As explained above, feeding of the mandrels 1 is brought about by the rolls 9. These rolls feed the mandrel at a positive and controlled rate of speed, slower or faster in order to control the wall thickness of the plastic deposited on the mandrel, faster movement of course giving a thinner wall and vice versa. The magnet 10 serves to hold the mandrel under maintained control after it has passed beyond the rolls in a downward direction. If it were not for this magnet, there would be no control over the mandrel after it has left the pinch rolls, and it would tend to drop through the die at an uncontrolled rate of speed under the action of gravity. The magnet tends to pull the mandrel up towards the rolls and this mandrel is only carried down against the force of the magnet by the next succeeding mandrel. The operation is particularly important in enabling the movement of the mandrel to be under complete control at all times. Magnetic control in this way is readily effected. While other types of control can be utilized, the magnetic control is most easily carried out.

Immediately beneath the extruder 11, a split chuck or die 15 is mounted to receive the plastic ensheathed mandrel. The die 15 is opened and closed by cam, spring or other action. It is in open position as shown in Figure 4 while mandrel 1 emerges with its sheath of plastics from the extrusion orifice 13. Immediately below the open die and carried on the same base plate that supports the die, is a core 16 surrounded by a powerful electromagnet 17. The core 16 has a bore 18 leading to tapered orifice 19 over which the lower end of the mandrel 1 is seated. The orifice 19 may be either male as shown in Figure 6 or female as shown in Figure 7 where core 16' has bore 18' leading to orifice 19' which receives the tapered end of mandrel 1'. An air inlet pipe 191 introduces the air under pressure which air passing into the mandrel expands the plastic.

When the plastic ensheathed mandrel 1 has entered the open die 15, and the lower end of the mandrel is a short distance (for example about a half inch) from the core 16, the electromagnet 17 is actuated and a heavy surge of magnetism produced. This is sufficiently powerful to overcome the magnetic attraction of the upper magnet 10 on the mandrel 1 and also to break the low tensile strength of the hot plastic tube between mandrel 1 and the next succeeding mandrel as indicated at 20. Mandrel 1 is thus pulled downwardly under the influence of magnet 17 into mold 15. The mandrel next succeeding mandrel 1 is however still held by the pinch rolls 9, 9 and therefore is not drawn down with mandrel 1 at this time.

When the mandrel 1 with its plastic sheath is in position within mold 15, the mold is closed, the thicker end portions 14a and 14c of plastic being gripped firmly between the split-halves 15', 15' of the mold as shown in Figure 5. A plunger 21 exerts pressure on the upper end of the mandrel 1 while air under pressure is admitted through pipe 191. The plastic is hot enough to be expandible, and the air entering through perforations 5 (Figure 6) expands the central portion 22 of the plastic tube into contact with the mold walls 23 to shape the body of the expanded plastic tube. The ends 14a and 14c are molded at the same time into threaded cap-receiving ends 24, the mold halves being threaded for this purpose. The portions of the heavy walls 14a and 14c between the ends 24, 24 and the central portion 22 form shoulder portions 25, 25 of rigid character between the ends 24, 25 and the thin wall flexible central portion 22. As soon as the plastic has cooled or set, the mold is opened and the mandrel supported expanded tube is removed. The latter is cut transversely at 26 to form two collapsible tube preforms, the mandrel removed, and any flash on the preform ends removed.

In operation, the molds may be mounted as shown in Figure 9 on a turn table 27. The mold (Figure 10) has the split halves 15', 15' having opening 28 for reception of the plastic covered mandrel. The mold halves are normally closed by springs 29. A series of molds 15 is mounted on the turn table 27. As each mold 15 moves into mandrel receiving position, a lever 30 rides over stationary cam 31, which forces the mold halves apart against the spring action, to open the mold. The plastic covered mandrel is delivered into the mold opening 28, and further movement of table 27, carries the lever 30 past the cam 31, so that the mold halves move together to grip the plastic covered mandrel as described above. The mold carrying plastic covered mandrel then moves through an arc (for example 15°) to the expanding station, while the next succeeding mold moves into mandrel receiving position.

At the expanding station, as soon as the first mold has come to rest, the plunger 21 moves down against the mandrel in the mold, and air pressure is turned on, to blow air into the bore of the mandrel and expand the plastic tube as explained above. The plastic is cooled rapidly by the air blast and if desired by a cooling fluid circulating in the mold halves 15', 15' in cored passages 31, 31. Plunger 21 is withdrawn and the air blast discontinued automatically. Movement of the table 27 to the releasing station then takes place where the mold is opened by cam and lever action exactly like that described above for Figure 9 to release the expanded article. In fact if desired, the stations are desirably so operated that the opening of the mold to eject the finished article is one step preceding the mandrel receiving station, the mold being maintained opened by the same cam operation at both of these stations. The operation of the mold for opening and closing, the air blast control, and the ejection stations may be carried out in any desired way as for example by the same mechanism and by the same procedures as described in my application 772,095, filed September 4, 1947, for the same types of operations.

It has been pointed out above that when electromagnet 17 is actuated and a heavy surge of magnetism produced, it is sufficiently powerful to break the low tensile strength of the hot plastic tube between mandrel 1 and the next succeeding mandrel. This operation may be desirably utilized with plastics that offer difficulty in causing severance at a particular point. For example, it is very difficult to cut polyethylene in its plastic state because it is extremely sticky and tenacious. However at certain temperatures it may be fractured by a sudden jerking motion, and this operation may be utilized to separate the ensheathed mandrel in the forming die 15 from the mandrel travelling immediately behind, by this shock method. When the magnet 17 at the bottom of the die 15 is energized while the mandrel is still about ½ inch from the stop, the sudden energization may be utilized to separate the mandrel by a sharp, clean severance of plastic.

While the dimensions of collapsible tubes produced by the present invention, may vary widely as desired, the following illustrative data is exemplary. For a collapsible tube 1" to 1¼" in diameter with a finished length of from 5" to 7", the wall thickness may desirably be from .010" to .012" with a neck about double that thickness. As indicated such collapsible tube may be made two at a time, the total length being from 10" to 14" and the thickness of the plastic around ¼" mandrel being approximately .040" to .045" in thickness.

Having thus set forth my invention, I claim:

1. In a method of making expanded plastic articles, the steps of extruding organic plastic material in heated deformable condition, in the form of tubing, successively inserting a series of discrete tubular mandrels within the tubing as the latter attains its tubular shape as the tubing is being extruded, each mandrel having a central bore and perforations penetrating the mandrel from said bore to the exterior surface of the mandrel, the plastic covering the mandrel over the portion of the latter having perforations, withdrawing plastic covered mandrels successively from the extruding zone, transferring said plastic covered mandrels successively to an expanding zone, introducing fluid into the plastic covered mandrels successively to expand said plastic, setting the expanded plastic, and removing the expanded plastic from its mandrel.

2. A method as in claim 1 in which the expansion of the plastic takes place within a zone which restricts and determines the shape of the expanded plastic.

3. A method as in claim 1 in which the mandrel is of magnetizable material, and a magnetized zone is produced adjacent the extrusion zone to draw the mandrel successively into the extruded tubing.

CHARLES E. SLAUGHTER.

References Cited in the file of this patent

UNITED STATES PATENTS

| Number | Name | Date |
|---|---|---|
| 688,924 | Blair et al. | Dec. 17, 1901 |
| 1,127,381 | Byrnes | Feb. 2, 1915 |
| 1,930,788 | Buckner | Oct. 17, 1933 |
| 2,003,707 | De Witt | June 4, 1935 |
| 2,236,414 | Reach | Mar. 25, 1941 |
| 2,324,645 | Prehler | July 20, 1943 |
| 2,353,825 | Hofmann | July 18, 1944 |
| 2,452,607 | Slaughter | Nov. 2, 1948 |
| 2,458,920 | Wheller et al. | Jan. 11, 1949 |
| 2,469,130 | Rodman, Jr. | May 3, 1949 |
| 2,495,119 | McDevitt | Jan. 17, 1950 |
| 2,515,093 | Mills | July 11, 1950 |

FOREIGN PATENTS

| Number | Country | Date |
|---|---|---|
| 545,937 | Germany | Mar. 9, 1932 |
| 568,090 | Great Britain | Mar. 19, 1945 |
| 587,064 | Great Britain | Apr. 11, 1947 |
| 697,536 | Germany | Oct. 16, 1940 |
| 822,497 | France | June 4, 1943 |